United States Patent [19] [11] 4,096,092
Langer, Jr. [45] Jun. 20, 1978

| [54] | ZIEGLER TYPE CATALYST SYSTEM |
|---|---|
| [75] | Inventor: Arthur W. Langer, Jr., Watchung, N.J. |
| [73] | Assignee: Exxon Research & Engineering Co., Linden, N.J. |
| [21] | Appl. No.: 767,747 |
| [22] | Filed: Feb. 11, 1977 |
| [51] | Int. Cl.² .................. B01J 31/02; B01J 31/12 |
| [52] | U.S. Cl. .................. 252/429 C; 252/431 N; 526/153 |
| [58] | Field of Search .................. 252/429 C, 431 N |
| [56] | References Cited |

U.S. PATENT DOCUMENTS

| 3,135,724 | 6/1964 | Price | 252/429 C |
| 3,418,304 | 12/1968 | Langer et al. | 252/429 C |
| 3,489,736 | 1/1970 | Takahashi et al. | 252/429 C |
| 3,503,947 | 3/1970 | Kosaka et al. | 252/429 C |
| 3,642,746 | 2/1972 | Kashiwa et al. | 252/429 C X |
| 3,723,348 | 3/1973 | Apotleker et al. | 252/431 N X |
| 3,905,913 | 9/1975 | Corbellni et al. | 252/429 C X |

FOREIGN PATENT DOCUMENTS 46-35,847   1971   Japan.

Primary Examiner—Patrick P. Garvin
Assistant Examiner—William G. Wright
Attorney, Agent, or Firm—Richard E. Nanfeldt

[57] ABSTRACT

A new improved Ziegler type catalyst system for alpha-olefin type polymerization includes a mixture of at least one Group IVB to VIII transition metal halide, an alkyl metal dihalide, and an N or O containing alkyl metal compound which is an amide or an alkoxide. The improved catalyst system provides polymers having improved isotacticity at increased rates.

16 Claims, No Drawings

ZIEGLER TYPE CATALYST SYSTEM

FIELD OF THE INVENTION

A new impoved Ziegler type catalyst system for alpha-olefin type polymerization includes R'YX$_2$, at least one Group IVB to VIII transition metal halide and an alkyl metal compound selected from the group consisting of R'$_2$YOR" or R'$_2$YNR$_2$ at a concentration level of about 0.05 to about 5.0 mole per mole of TiCl$_3$, wherein X is a halide, R' is selected from the group consisting of C$_1$ to C$_{20}$ alkyl, branched alkyl, naphthenic, or aralkyl groups, R is selected from the group consisting of C$_3$ to C$_{10}$ bulky alkyl groups, cycloalkyl groups or a cyclic amine group, R" is selected from the group consisting of C$_1$ to C$_{20}$ alkyl groups, and Y is selected from the group consisting of aluminum, gallium, or indium. The improved catalyst system provides polymers having improved isotacticity at increased rates because of the formation in situ of the mixture of R'XAlNR$_2$ and R'$_2$AlX, wherein R'XAlNR$_2$ selectively complexes R'AlX$_2$ poisons but does not cause the formation of low tacticity polymers.

BACKGROUND OF THE INVENTION

There is extensive art on the polymerization of ethylene and higher alpha-olefins, including dienes, using Ziegler-type catalysts containing either alkyl metals or alkyl metals in which an alkyl group has been replaced by X, OR, SR, NR$_2$, etc., in combination with a transition metal compound of Groups IVB-VIII. X = halid and R = C$_1$ to C$_{20}$ hydrocarbyl substituent.

For the commercial stereospecific polymerization of propylene and higher alpha olefins, only a few alkyl metal compounds have been found effective in combination with titanium or vanadium chlorides. Commercially, only R$_2$AlCl or R$_3$Al are used together with a crystalline form of TiCl$_3$ or TiCl$_3$.nAlCl$_3$. Mixtures of R$_3$Al and R$_2$AlCl and RAlCl$_2$ are made in situ and have been disclosed as catalyst components frequently in the art. R is preferably ethyl (Et) or isobutyl; $n$ = 0.01 to 0.75.

It is also well known that, in propylene polymerizations using TiCl$_3$, catalyst activity decreases sharply in the series AlEt$_3$, Et$_2$AlCl, EtAlCl$_2$ (Malatesta, Can. J. Chem. 37, 1176 (1959) and Boldyreva et. al., Vysokomolekul. Soedin 1, 900 (1959); C.A. 55, 2454a (1961). When the chloride in Et$_2$AlCl is replaced by OR, SR, SeR or NR$_2$, activity and polymer isotacticity usually drop drastically (Danusso, J. Polymer Sci. C4, 1497 (1964).

The present inventor has also shown that R'$_2$AlNR$_2$ and R'$_2$AlOR cocatalysts produce polypropylene which is nearly atactic (Langer, Seventh Biennial Polymer Symposium, Florida 12/8/74). Therefore, the art teaches that both activity and polymer isotacticity are extremely low when R$_2$AlNR$_2$ (aluminum amide) compounds are used as replacements for conventional alkyl metal cocatalyst components.

This inventor's U.S. 3,418,304 discloses a complex of alkyl metal compounds such as Et$_2$AlNEt$_2$ and Lewis Acid salts such as AlCl$_3$ and MgCl$_2$, e.g. Et$_2$AlNEt$_2$.AlCl$_3$ as cocatalysts to entirely replace conventional aluminum alkyls, but such complexes are entirely different from the concept of utilizing certain metal amides as catalyst supplements for conventional Ziegler systems with EtAlCl$_2$ as cocatalyst.

U.S. 3,255,169 discloses a Ziegler catalyst system employing aluminum hydroaminate compounds. Typical of these is HAL(NHC$_2$H$_5$)$_2$ which is used as a total substitution for the conventional aluminum alkyl cocatalyst.

Recently U.S. Pat. No. 3,905,913 has issued disclosing the use of

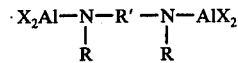

where X is H or halogen, both Rs are hydrocarbon radicals; and R' is a divalent hydrocarbon radical. These compounds are not closely related to those of the invention herein. And they are used as the sole aluminum-containing cocatalyst component.

SUMMARY OF THE INVENTION

The present instant invention relates to unique and novel improved Ziegler-type catalyst systems for the conventional alpha-olefin type polymerizations thereby yielding polymers having a high degree of isotactic stereoregularity.

An object of my present invention is to provide improved Ziegler-type catalyst systems having a major increase in polymerization activity without significantly affecting the polymer crystallinity, e.g. isotacticity, wherein the catalyst system includes at least one Group IVB to VIII transition metal halide, an alkyl metal dihalide type compound R'YX$_2$ and an alkyl metal compound selected from R'$_2$YOR" and R'$_2$YNR$_2$, wherein R' is selected from the group consisting of C$_1$ to C$_{20}$ alkyl, branched alkyl, naphthenic, or aralkyl groups, X is a halide group, R is selected from the group consisting of C$_3$ to C$_{10}$ bulky alkyl groups, cycloalkyl groups, or a cyclic amine structure, and R" is selected from the group consisting of C$_1$ to C$_{20}$ alkyl groups, and Y is selected from the group consisting of aluminum, gallium, and indium.

A further object of my present invention is to provide an improved process for alpha-olefin type polymerizations, wherein the polymerization activity is increased without adversely affecting the crystallinity of the formed polymer.

A still further object of my present invention is to provide an improved Ziegler-type catalyst system wherein catalyst poisons are consumed in situ thereby minimizing the formation of atactic type polymers.

GENERAL DESCRIPTION OF THE INVENTION

An alkyl aluminum dihalide R'AlX$_2$ type compound is known as a poison (deactivator) for Ziegler-type polymerizations in that the R'AlX$_2$ is deposited on the active sites of the TiCl$_3$. It has been shown that the addition of small amounts of EtAlCl$_2$ to a TiCl$_3$-Et$_2$AlCl catalyst system dramatically reduces polymerization rates (Ingberman, et. al., J. Polymer Sci. A4, 2781 (1966).

In this invention, it has been surprisingly found that this catalyst poison R'AlX$_2$ can be effectively removed from the surface of the TiCl$_3$ by the addition of an alkylmetal compound such as R'$_2$YOR" or R'$_2$YNR$_2$ to the TiCl$_3$-R'AlX$_2$ system. The R'$_2$YNR$_2$ or R'$_2$YOR" reacts selectively with the R'AlX$_2$:

$$R'_2YOR'' + R'AlX_2 \rightarrow R'XAlOR'' + R'_2YX$$

The $R'AlX_2$ is effectively transformed in situ into the more active species $R'_2YX$ thereby providing a higher number of active sites per unit of catalyst volume thereby yielding both higher activity and higher isotacticity than is obtained using the conventional $R'_2AlCl$ or $R'_3Al$. These results are especially remarkable when one realizes that the new alkyl metal mixtures consist of a known catalyst poison ($R'AlX_2$) plus a known low activity, low stereospecificity alkyl metal compound ($R'_2AlNR_2$).

This improvement resides in the use of $R'AlCl_2$, instead of $R'_2AlCl$ or $R'_3Al$, with these alkyl metal components. The higher isotacticity obtained in this invention is believed to result from the formation in situ of complexing agents for $R'AlCl_2$ which do not contribute to polymer formation (for example, $R'XAlNR_2$ rather than $R'_2AlNR_2$). While not bound to theory, the following reactions are thought to be involved:

1. $R'AlCl_2 + R'_2AlNR_2 \rightarrow R'_2AlCl + R'AlClNR_2$

2. $R'_2AlCl + TiCl_3 \rightarrow R'TiCl_2 + R'AlCl_2$

3. $R'AlCl_2 + R'AlClNR_2 \rightarrow$ 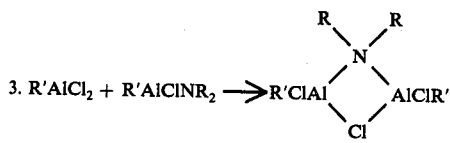

The $R'ClAlNR_2$ and its complex with $R'AlCl_2$ are not active cocatalysts for $TiCl_3$ and therefore do not contribute to polymer formation. When $R'_2AlNR_2$ is used with $R'_2AlCl$ or $R'_3Al$, however, it remains a dialkyl aluminum compound and may contribute low isotacticity polymer.

The alkyl metal compounds usable in the invention have the general structures $R'_2YNR_2$ and $R'_2YOR''$ wherein $R' = C_1$ to $C_{20}$ hydrocarbyl group such as alkyl, naphthenic, or aralkyl, preferably a $C_{1-12}$ alkyl, $R'' = C_1$ to $C_{20}$ hydrocarbyl group, preferably primary, and $R = C_3$ to $C_{10}$ bulky alkyl or cycloalkyl groups, including ring structures such as $R_2Al$ piperidide and $Et_2Al$ pyrrolidide. Sterically hindered amide groups are especially preferred because they interact less strongly with the $TiCl_3$ and have greater driving force to form mixed dimers with the $RAlCl_2$ poison. Such compounds have large, bulky R groups by virtue of branching on the carbons alpha, beta or gamma to the nitrogen. Illustrative examples of R groups include isopropyl, isobutyl, neopentyl, 3,3-diethylhexyl, 2-ethylhexyl, 2-butyl, 2-octyl, 3-pentyl, cyclohexyl, cyclopentyl, 2-methylcyclopentyl, 3-ethylcyclohexyl, and mixtures including mixtures in which one R group may be a less bulky saturated group such as a normal alkyl. Also, the two R groups may be part of a cyclic amine structure, such as pyrrolidyl, piperidyl and the like and their various alkyl substituted derivatives especially when the substituents are on the carbon atoms adjacent to the nitrogen atoms, such as 2,6-dimethylpiperidide, 2,2,6,6-tetramethylpiperidide, and the like. The Y group of $R'_2YNR_2$ or $R'_2YOR''$ is selected from the group consisting of aluminum, gallium, or indium, most preferably aluminum.

These new cocatalyst mixtures are useful with any of the crystal modifications of $TiX_3$, with solid solutions of Groups II-III metal salts in $TiX_3$ (also referred to as "cocrystallized" such as $TiCl_3.nAlCl_3$ or $TiCl_3.nMgCl_2$, and with $TiX_3$ or $TiX_4$ supported on salts such as $MgCl_2$ or hydroxychloride, oxides or other inorganic or organic supports, wherein $X = Cl$ or $Br$, preferably Cl. Lewis bases, alcohols, carboxylic acids, etc. may also be present. The most preferred crystal structure is delta or pseudo delta, the latter being a mixture of disordered, very small alpha and gamma crystallites. This invention is also useful for increasing the activity and/or stereospecificity of supported $TiCl_4$ and $TiCl_3$-type catalysts and other supported predominantly trivalent titanium compounds. The $TiCl_3$-type catalysts may be prepared from $TiCl_4$ by any of the reduction and crystallization procedures known in the art ($H_2$, metal, metal hydrides, metal alkyls, etc.)

While this invention is described particularly for making highly isotactic polypropylene using $TiCl_3$ catalyst, it may be used with any of the Ziegler type catalyst heavy metal halides of Groups IVB to VIB and VIII such as Ti, Cr, or V, preferably Ti or V.

For the $R'AlX_2$ compound, $R'$ is a $C_1$ to $C_{20}$ alkyl, branched alkyl, naphthenic, or aralkyl group, preferably a $C_2$ to $C_4$ alkyl group; $X =$ the same or different halide groups preferably at least one of which is chloride. Suitable examples include $EtAlCl_2$, $EtAlClBr$, $PrAlClI$, $BuAlCl_2$, $C_{12}H_{25}AlCl_2$, etc.

The molar ratio of the $R'AlX_2$ to the alkyl metal compound should be in the range of about 0.5:1 to 1.5:1, preferably about 1:1, based on the sum of the $R'AlX_2$ charged plus the $R'AlX_2$ produced during polymerization. In addition, some $R'_2AlX$ or other alkyl metal compounds may also be present, but it is not required for high activity and stereospecificity.

The alkyl metal compound effect is obtained with all the usual polymerization conditions. Thus solvent, temperature and monomer concentrations are not critical. Increased activity is obtained with all alpha olefins from ethylene to $C_{10}$ and higher as well as in copolymerizations such as ethylene-α-olefin, ethylene/diolefin, propylene/α-olefin, propylene/diolefin and ethylene/α-olefin/diene copolymerizations. The amount of alkyl metal cocatalyst usually in the range of 0.1:1 to 20:1, preferably about 0.5:1 to 10:1 mole ratio of alkyl metal cocatalyst to transition metal compound. Further increases in activity or stereospecificity may be obtained by premixing the transition metal component with either the amide or the alkyl dihalide, or both.

The halide group in the aluminum components of the catalyst is preferably chloride or bromide, with chloride being most preferred.

The alkyl groups affixed onto the metal of the alkyl metal compound each have about 1 to 20 carbons per alkyl group. However, for propylene and higher alpha olefins, polymer isotacticity decreases with increasing alkyl chain length. Therefore, $C_2$ to $C_4$ alkyl groups are preferred when isotactic polymers are desired.

The alkyl groups attached to the amide nitrogen of the alkyl metal compound are preferably attached to secondary or tertiary carbons to achieve sufficient steric hindrance. Primary alkyls are useful only when there is sufficient branching on the carbon atom beta or gamma to the nitrogen. Open chain as well as cyclic groups may be used. The most preferred groups are isopropyl and cyclohexyl groups.

The primary alkyl groups in the alkoxide moiety of the alkyl metal compound may contain 1-20 carbons, preferably more than about 4 in order to improve solubility of the complex with $R'AlCl_2$ and the alkyl chloroaluminum alkoxide product. Branching and ring structures may be present as long as they do not hinder the oxygen atom from coordinating with $R'AlCl_2$.

The additives appear to be useful with any Group IV-B to VIII Ziegler transition metal catalyst. Trivalent titanium and vanadium chlorides are preferred with those having low aluminum content being most preferred. The additives also appear to be generally useful for any monomer and mixtures of monomers.

DETAILED DESCRIPTION OF THE PREFERRED EMBODIMENTS

The advantages of the unique and novel catalysts system, the process for the alpha-olefin polymerization and the unique and novel compositions of the mixed dimers of the present instant invention can be more readily appreciated by reference to the following examples and tables.

The concept of the invention can be restated as follows. The alkyl metal compounds have been found to be effective for greatly increasing the activity and stereospecificity of $R'AlX_2$ catalysts, especially for propylene polymerization. These are dialkyl aluminum dialkyl amides, and dialkylaluminum alkoxides. The amides most preferably are sterically hindered, whereas the alkoxides should be the relatively unhindered primary alkoxides. These alkyl metal compounds react selectively with the $RAlCl_2$ poison to remove it from the catalyst sites.

EXAMPLE 1

A series of O-Y of polymerization runs were carried out in a 1 liter baffled resin flask fitted with an efficient reflux condenser and a high speed stirrer. In a standard procedure for propylene polymerizations, 475 ml n-heptane (1 ppm water) containing 10 mmole $Et_2AlCl$ (1.20 g) was charged to the reactor under dry $N_2$ heated to reaction temperature (65° C.) and saturated with pure propylene at 765 mm pressure. The $TiCl_3$ (1.00 g) (6.5 mmole) was charged to a catalyst tube containing a stopcock and a rubber septum cap. Polymerization started when the $TiCl_3$ was rinsed into the reactor with 25 ml n-heptane from a syringe. Propylene feed rate was adjusted to maintain an exit gas rate of 200-500 cc/min. at a pressure of 765 mm. After one hour at temperature and pressure, the reactor slurry was poured into one liter isopropyl alcohol, stirred 2-4 hours, filtered, washed with alcohol and vacuum dried.

The $TiCl_3$ was prepared by reduction of $TiCl_4$ with $Et_2AlCl$ followed by treatment with diisopentyl ether and $TiCl_4$ under controlled conditions, yielding a high surface area delta $TiCl_3$ having low aluminum content (hereinafter "low-aluminum $TiCl_3$").

The diethyl aluminum diisopropylamide ($Et_2AlN(i-Pr)_2$ was added to the reactor together with the $EtAlCl_2$. The results are summarized in Table I.

TABLE I

| | PROPYLENE POLYMERIZATIONS $EtAlCl_2/Et_2AlN(iPr)_2$ COCATALYSTS | | | | |
|---|---|---|---|---|---|
| | Mmoles | | | g Polymer/ | % Heptane |
| Runs | DEAC | EADC | Amide | g $TiCl_3$/Hr | Insolubles |
| O (control) | 10 | 0 | 0 | 48.3 | 96.2 |
| P | 0 | 2.5 | 2.5 | 83.1 | 95.6 |
| Q | 0 | 5 | 5 | 77.7 | 97.1 |
| R[e] | 0 | 10 | 10 | 45.9 | 94.2 |
| S | 0 | 10 | 6 | 12.6 | 90.1 |
| T | 0 | 5 | 10 | 21.3 | 82.9 |
| U[a] | 0 | 5 | 5 | 89.1 | 97.0 |
| V[b] | 0 | 3 | 3 | 81.5[c] | 94.4 |

TABLE I-continued

| | PROPYLENE POLYMERIZATIONS $EtAlCl_2/Et_2AlN(iPr)_2$ COCATALYSTS | | | | |
|---|---|---|---|---|---|
| | Mmoles | | | g Polymer/ | % Heptane |
| Runs | DEAC | EADC | Amide | g $TiCl_3$/Hr | Insolubles |
| W | 5 | 5 | 5 | 55.2 | 98.5 |
| X | 8 | 2 | 2 | 56.0 | 98.0 |
| Y[d] (control) | 0 | 5$AlCl_3$ | 5 | 3.8 | 61.6 |

[a]Premixed 1 g $TiCl_3$ with EADC and amide in 10 ml. n-heptane, 25° C., 30 min. before charging to reactor
[b]Same as (a) but used only 0.6 g $TiCl_3$
[c]Average rate for 4 hours
[d]U.S. Pat. No. 3,418,304
[e]0.5 g $TiCl_3$ catalyst Compared to Control Run O, the results in Table I show the following:

(1) In the absence of $Et_2AlCl$, equimolar amounts of $EtAlCl_2$ and amide are superior to $Et_2AlCl$ (Runs P, Q, U and V).

(2) Activity increases with decreasing concentration of $EtAlCl_2$.Amide (Runs P>Q>R), except when premixing is carried out.

(3) Equimolar amounts of $EtAlCl_2$ and amide are needed because each component alone is a catalyst poison (Run Q vs. S and T). In both Run S (excess $EtAlCl_2$) and Run T (excess $Et_2AlN(iPr)_2$) the catalyst activity dropped sharply below that of the control, whereas equimolar amounts in Run Q gave 61% higher activity than the control.

(4) Premixing the total catalyst further increased activity (Run U vs. Q).

(5) Catalyst activity is nearly constant with polymerization time (Run V vs. P, Q and U).

(6) Addition of $Et_2AlCl$ to equimolar mixtures of $EtAlCl_2$ and amide gives somewhat smaller increases in activity but substantially higher heptane insolubles (Runs W and X vs. P and O).

(7) All the results using $EtAlCl_2$ are greatly superior to that using $AlCl_3$ (Run Y), the catalyst in U.S. Pat. No. 3,418,304. The latter gave negligible activity at atmospheric pressure and a low heptane insolubles due to the waxy component and the low yield.

EXAMPLE II

The procedure of Example I, Runs P, Q, R and W were followed except that 1 g commercial $TiCl_3$ AA was used. Activity increased 22, 45, 52 and 55% over the control run using 10 mmoles $Et_2AlCl$. Therefore, in contrast to the data in Example I using a low aluminum $TiCl_3$, the activity using $TiCl_3$.0.33 $AlCl_3$ in this example increased with increasing concentration of $EtAlCl_2$.Amide and it was improved further when $Et_2AlCl$ was also added.

The different cocatalyst response in this example (compared to Example I) is believed to be due to the $AlCl_3$ content of the $TiCl_3$ in Example II. A larger amount of $EtAlCl_2$ poison is produced by the reaction of dialkylaluminum compounds with $AlCl_3$ and this requires a larger amount of the amide component to destroy it.

EXAMPLE III

The procedure of Example I, Run Q was repeated except that 1g $VCl_3$ (Electromet, dry ball milled 17 days) was used instead of $TiCl_3$. Activity increased to 21.5g polypropylene/g $VCl_3$/hr using 5 mmoles $EtAlCl_2$.Amide, up from a control run of 17.6 g/g $VCl_3$/hr using 5 mmoles $Et_2AlCl$.

EXAMPLE IV

Octene-1 was polymerized following the procedure of Example I, Run Q, except that 100 ml. octene-1 was charged to the reactor with 900 ml. n-heptane. Polymerization rate increased over that of the control using $Et_2AlCl$.

EXAMPLE V

The procedure of Example I, Run Q was followed in a new series of Runs A'–I' to determine the effect of structural differences in a series of dialkylaluminum amides. Several different $TiCl_3$ preparations (low aluminum) prepared by the technique of Example I were used in this study so the polymerization rates are expressed relative to the respective control rates (10 mmoles $Et_2AlCl/1g.TiCl_3$) taken as 100 (Table II).

TABLE II
EFFECT OF AMIDE STRUCTURE

| Run | Amide | Relative Activity[a] | % Heptane Insolubles |
|---|---|---|---|
| A' | $Et_2AlNEt_2$ | 54.6 | 92.3 |
| B' | $Et_2AlN(C_6H_5)_2$ | 60 | 95.0 |
| C' | $Et_2AlNC_5H_{10}$[c] | 127 | 96.6 |
| D' | $Et_2AlN(2EH)_2$[d] | 127 | 94.8 |
| E' | $Et_2AlN(iPr)_2$ | 156 | 97.2 |
| F' | $Et_2AlN(cyC_6H_{11})_2$ | 158 | 97.2 |
| G' | $Me_2AlN(iPr)_2$ | 10.5 | 73.8 |
| H' | $(C_8H_{17})_2AlN(iPr)_2$ | 84.2 | 78.8 |
| I' | $(C_{12}H_{25})_2AlN(iPr)_2$[b] | 64.6 | 93.7 |

[a]Control activity = 100 (10 mmole $Et_2AlCl/1g TiCl_3$).
[b]Not pure
[c]Diethylaluminum piperidide
[d]Diethylaluminum di(2-ethylhexyl) amide.

The results in the above Table II show:

(1) Both catalyst activity and polypropylene heptane insolubles increase with increasing steric bulk around the amide nitrogen (Runs E' and F' vs. C' and D' vs. A') and with increasing basicity of the amide nitrogen (Run F' vs. Run B'). The unhindered $Et_2AlNEt_2$ (Run A') decreased activity below that of the control.

(2) The alkyl groups attached to the aluminum are also important, with ethyl>octyl>methyl (Runs E', H' and G').

EXAMPLE VI

The procedure of Example I was followed in a series of Runs J'–O' except that various additives were tested in place of the amide component. The results are summarized as follows in Table III.

TABLE III

| Run | Additive | Relative Activity[a] | % Heptane Insolubles |
|---|---|---|---|
| J' | $Et_2AlOC_{15}H_{31}$ | 119 | 94.8 |
| K' | $BuMgN(iPr)_2$ | Insoluble complex with $EtAlCl_2$ | |
| L' | $Et_2AlP(i-Bu)_2$ | 13.8 | 83.8 |
| M' | $Et_2AlSC_{12}H_{25}$ | 40.6 | 96.9 |
| N' | $Et_2AlOCHEt_2$ | 91.3 | 90.0 |
| O' | $Et_2AlOCMe_3$ | 9.4 | 57.2 |

[a]Control activity = 100 (10 mmole $Et_2AlCl/1 g TiCl_3$).

These experiments show that at this stage of our knowledge, S and P cannot be used to replace N in the aluminum additive. Only the primary alkoxy group (Run J') gave a slight increase in activity compared to the control. The less basic heteroatoms gave the lowest activity (Runs L' and M' vs. Run J'). In contrast to the results in Example XIV with amide additives, the most hindered alkoxides gave the lowest activity (Runs O' and N' vs. J'). These results show that, except for unhindered OR groups, the O, S and P containing groups are not useful replacements for hindered amide groups.

EXAMPLE VII

The procedure of Example I, Run Q was followed in a series of Runs P'–S' except that various alkyl aluminum dihalides were used in combination with diethylaluminum diisopropylamide. The results are summarized as follows in Table IV.

TABLE IV
EFFECT OF ALKYLALUMINUM DIHALIDE STRUCTURE

| Run | $RAlX_2$ | Relative Activity | % Heptane Insolubles |
|---|---|---|---|
| P' | $MeAlCl_2$ | 94.3 | 93.0 |
| Q' | $EtAlCl_2$ | 156 | 97.2 |
| R' | $C_8H_{17}AlCl_2$ | 128 | 85.1 |
| S' | $EtAlBr_2$ | 116 | 94.8 |

The order of decreasing activity of alkyl groups on aluminum dichloride is the same as was observed in Example V for the amide component (ethyl>octyl>λ methyl). The bromide is less reactive than the dichloride, indicating that the exchange reactions with the amide did not go to completion or the ethyl bromoaluminum amide product from the exchange interferes with active sites more strongly than does ethyl chloroaluminum amide.

EXAMPLE VIII

The procedures of Example I, Runs O, P, R, X and Y were followed in a series of Runs CC–GG except that 1g commercial $TiCl_3$ AA was used and the diluent was xylene. The results are shown as follows in Table V.

TABLE V

| Run | Mmoles DEAC | Mmoles EADC | Mmoles Amide | g Polymer/ g $TiCl_3$/Hr | %Heptane Insolubles |
|---|---|---|---|---|---|
| CC(control) | 10 | 0 | 0 | 39.6 | 92.8 |
| DD | 0 | 2.5 | 2.5 | 42.0 | 91.4 |
| EE | 0 | 10 | 10 | 57.2 | 81.7 |
| FF | 8 | 2 | 2 | 44.4 | 91.6 |
| GG[a] (control) | 0 | $5AlCl_3$ | 5 | 0.83 | — |

[a]U.S. Pat. No. 3,418,304

Higher activity was obtained in all three runs compared to control Run CC. Activity in xylene diluent increased with increasing amide concentration (Runs DD and EE) opposite to the results in heptane diluent (Example I, Runs P and R). However, heptane insolubles decreased in xylene.

The catalyst of U.S. Pat. No. 3,418,304 (Run GG) gave much lower activity than the control, being essentially inactive at atmospheric pressure.

EXAMPLE IX

A series of runs HH to TT was made following the procedure of Example I except that various additive combinations were used. Another preparation of low-aluminum $TiCl_3$ was used made by the procedures of Example I. The results are summarized below in Table VI.

TABLE VI

| Run | Mmoles DEAC | Mmoles Additives A | B | Relative Activity | % Heptane Insolubles |
|---|---|---|---|---|---|
| HH[a] | 8 | 2 $Et_2AlN(iPr)_2$ | 2 $C_6H_5BCl_2$ | 46 | 90.2 |
| II[a] | 8 | 2 $Et_2AlN(iPr)_2$ | 2 $Me_3SnCl$ | 119 | 96.8 |
| JJ[a] | 8 | 2 $Et_2AlN(iPr)_2$ | 2 t-BuCl | 112 | 96.5 |
| KK[b] | 8 | 5 $Et_2AlN(iPr)_2$ | 5 $Me_3SnCl$ | 110 | 96.4 |
| LL[b] | 9 | 5 $Et_2AlN(iPr)_2$ | 5 $Me_3SnCl$ | 2.4 | — |
| MM[b] | 9 | 5 $Et_2AlN(iPr)_2$ | 5 $Me_3SiCl$ | 18 | 80.0 |
| NN[a] | 8 | 2 $Et_2AlP(iBu)_2$ | 2 $EtAlCl_2$ | 37 | 96.3 |
| OO | 10 | 2 $Et_2AlP(iBu)_2$ | 0 | 50 | 83.8 |
| PP | 10 | 2 $Et_2AlOC_{15}H_{31}$ | 0 | 131 | 91.0 |
| QQ | 10 | 2 $EtZnOC_{15}H_{31}$ | 0 | 62 | 42.9 |
| RR | 10 | 1 $B(OBu)_3$ | 0 | 113 | 95.9 |
| SS | 10 | 1 $B(NMe_2)_3$ | 0 | 55 | 96.3 |
| TT | 8 | 2 $Et_2Al$-2,2,6,6-tetramethylpiperidide | 2 $EtAlCl_2$ | 113 | 97.2 |

[a]Additives A + B were premixed 15 minutes in 10 ml. n-heptane at 25° C.
[b]same as [a] but premixed 4 days.

The very low activity in Runs LL and MM show that exchange between components A and B did not produce $Et_2AlCl$, but instead gave the $EtClAlN(iPr)_2$. This would account for the slight improvement in Runs II, JJ and KK in which $Et_2AlCl$ was also present. Therefore, the results in Runs HH through MM show that chloride derivatives of boron, tin, carbon and silicon are not satisfactory replacements for $EtAlCl_2$.

The $Et_2AlP(iBu)_2$ (Runs NN and OO) gave poor results in the presence of excess $Et_2AlCl$. Therefore, dialkylaluminum dialkylphosphides are not satisfactory substitutes for $R_2AlNR_2$.

Of the remaining additives tested in Runs PP through SS, only $Et_2AlOC_{15}H_{31}$ and $B(OBu)_3$ increased activity. The activity obtained using $B(OBu)_3$ was probably due to the formation of some $EtClAlOBu$ by exchange with $Et_2AlCl$. Therefore, compounds of the type $R_2AlOR$ and $RXAlOR$ are both effective scavengers for $RAlCl_2$ poison. Based on the results in Example XV, the alkoxides made from primary alcohols are preferred.

The $Et_2Al$-2,2,6,6-tetramethylpiperidide (Run TT) is another example of a useful hindered dialkylaluminum amide.

Since many modifications and variations of this invention may be made without departing from the spirit or scope of the invention thereof, it is not intended to limit the spirit or scope thereof to the specific examples thereof.

What is claimed is:

1. An improved catalyst composition adaptable for use in an alpha-olefin polymerization which comprises a mixture of:
   (a) at least one Group IVB to VIII transition metal halide;
   (b) an alkyl metal dihalide cocatalyst, the metal of said alkyl metal dihalide cocatalyst being selected from the group consisting essentially of aluminum, gallium and indium;
   (c) a compound having the structure of $R'_2YNR_2$ wherein Y is selected from the group consisting of aluminum, indium and gallium, R' is selected from the group consisting of $C_1$ to $C_{20}$ alkyl, branched alkyl, naphthenic or aralkyl groups and R is a $C_3$ to $C_{10}$ bulky alkyl or cycloalkyl group, said cocatalyst being in a mole ratio of 0.5 to 1.5 moles of said cocatalyst to said compound.

2. The composition of claim 1 wherein said compound is a dialkyl aluminum dialkyl amide.

3. The composition of claim 1, wherein the metal of said alkyl metal dihalide is aluminum.

4. The composition of claim 1 wherein said alkyl metal dihalide is alkyl aluminum dichloride.

5. The composition of claim 4, wherein said compound is diethylaluminum diisopropylamide.

6. The composition of claim 4, wherein said compound is diethylaluminum dicyclohexylamide.

7. The composition of claim 1, wherein said transition metal is selected from the group consisting essentially of $TiCl_3$ on a support, $TiCl_4$ on a support, low aluminum $TiCl_3$ or cocrystallized $TiCl_3$ and mixtures thereof.

8. The composition of claim 1, wherein said aluminum alkyl cocatalyst is ethyl aluminum dichloride.

9. The composition of claim 1, wherein said transition metal halide is $TiCl_3$ having a low aluminum content.

10. An improved catalyst composition adaptable for use in an alpha-olefin polymerization which comprises a mixture of:
    (a) at least one Group IVB to VIII transition metal halide;
    (b) an alkyl metal dihalide cocatalyst, the metal of said alkyl metal dihalide cocatalyst being selected from the group consisting essentially of aluminum, gallium and indium;
    (c) a compound having the structure of $R'_2YOR''$ wherein Y is selected from the group consisting of aluminum, gallium or indium, R' is a $C_1$ to $C_{20}$ alkyl, branched alkyl, naphthenic or aralkyl group and R'' is a $C_1$ to $C_{20}$ hydrocarbyl group, said cocatalyst being in a mole ratio of 0.5 to 1.5 moles of said cocatalyst to said compound.

11. The composition of claim 10 wherein said compound is a dialkyl aluminum alkoxide.

12. The composition of claim 10 wherein said metal of said cocatalyst is aluminum.

13. The composition of claim 10 wherein said alkyl metal dihalide is an alkyl aluminum dichloride.

14. The composition of claim 10 wherein said transition metal is selected from the group consisting essentially of $TiCl_3$ on a support, $TiCl_4$ on a support, low aluminum $TiCl_3$ or cocrystallized $TiCl_3$ and mixtures thereof.

15. The composition of claim 10 wherein said aluminum alkyl cocatalyst is ethyl aluminum dichloride.

16. The composition of claim 10 wherein said transition metal halide is $TiCl_3$ having a low aluminum content.